US011550827B2

(12) United States Patent
Ravizza et al.

(10) Patent No.: US 11,550,827 B2
(45) Date of Patent: Jan. 10, 2023

(54) GRAPH ENABLED LOCATION OPTIMIZATION

(71) Applicant: INTERNATIONAL BUSINESS MACHINES CORPORATION, Armonk, NY (US)

(72) Inventors: Stefan Ravizza, Wallisellen (CH); Shikhar Kwatra, San Jose, CA (US); Frederik Frank Flöther, Schlieren (CH); Saurabh Yadav, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 16/948,515

(22) Filed: Sep. 22, 2020

(65) Prior Publication Data

US 2022/0092091 A1    Mar. 24, 2022

(51) Int. Cl.
*G06F 16/29*    (2019.01)
*G01C 21/32*    (2006.01)
(Continued)

(52) U.S. Cl.
CPC ............. *G06F 16/29* (2019.01); *G01C 21/32* (2013.01); *G01C 21/387* (2020.08); *G06F 16/84* (2019.01)

(58) Field of Classification Search
CPC ......... G06F 16/29; G06F 16/84; G01C 21/32; G01C 21/387; G06Q 10/047
See application file for complete search history.

(56) References Cited

U.S. PATENT DOCUMENTS 5,596,493 A  1/1997  Tone
8,732,039 B1  5/2014  Chen
(Continued)

FOREIGN PATENT DOCUMENTS

CN    108880664 A    11/2018
JP      4938682 B2     5/2012

OTHER PUBLICATIONS

Baharmand, et al., "A Framework for Shelter Location Decisions by Ant Colony Optimization," ISCRAM 2015, May 2015, 9 pages, Researchgate, DOI: 10.13140/RG.2.1.4901.1921, Retrieved from the Internet: <URL: https://www.researchgate.net/profile/Hossein_Baharmand/publication/279867860_A_Framework_for_Shelter_Location_Decisions_by_Ant_Colony_Optimization/links/55c9dd7d08aeb9756748a5f7/A-Framework-for-Shelter-Location-Decisions-by-Ant-Colony-Optimization.pdf>.

(Continued)

*Primary Examiner* — Rami Khatib
*Assistant Examiner* — Gabriel Joseph Rene Lambert
(74) *Attorney, Agent, or Firm* — Samuel A. Waldbaum

(57) ABSTRACT

A method and a related system for allocating target locations to optimize trajectories between several objects and the target locations may be provided. The method comprises capturing location data of the target locations as well as location and movement data of the objects, building a graph using the target locations as well as the location and movement data and integrating constraints into the graph. Furthermore, the method comprises determining for each of the several objects a desired target location using a first optimization system, thereby determining endpoints of a trajectory between each of the objects and its respective desired target location and selecting for each of the several objects an optimal path as the trajectory between the object and the desired target location, using a second optimization system, (Continued)

and taking into account movements of other objects along their trajectories.

17 Claims, 5 Drawing Sheets

(51) Int. Cl.
  *G06F 16/84* (2019.01)
  *G01C 21/00* (2006.01)

(56) References Cited

U.S. PATENT DOCUMENTS

| | | | | |
|---|---|---|---|---|
| 8,788,314 | B2 | 7/2014 | Procopiuc | |
| 9,191,304 | B1 | 11/2015 | Plate | |
| 2017/0344007 | A1* | 11/2017 | Song | G01C 21/206 |
| 2018/0173242 | A1* | 6/2018 | Lalonde | G05D 1/0214 |
| 2019/0094866 | A1* | 3/2019 | Moore | G05D 1/0278 |
| 2019/0122543 | A1* | 4/2019 | Matus | G08G 1/0141 |
| 2019/0195639 | A1* | 6/2019 | Malewicz | G06Q 10/047 |
| 2021/0362337 | A1* | 11/2021 | Kim | B25J 13/003 |

OTHER PUBLICATIONS

Boonmee, et al., "Facility location optimization model for emergency humanitarian logistics," International Journal of Disaster Risk Reduction, Feb. 2017, 15 pages, Reaserchgate, DOI: 10.1016/j.ijdrr.2017.01.017, Retrieved from the Internet: <URL: https://www.researchgate.net/publication/313353829_>.

Chanta, et al., "Shelter-site selection during flood disaster," Lecture Notes in Management Science, 2012, pp. 282-288, vol. 4, Tadbir Operational Research Group Ltd., ISSN 1927-0097, Retrieved from the Internet: <URL: http://orlabanalytics.ca/lnms/archive/v4/lnmsv4p282.pdf>.

Geng, et al., "Multi-Criteria Location Model of Emergency Shelters in Humanitarian Logistics," Sustainability, 2020, 21 pages, vol. 12, Issue 5, DOI:10.3390/su12051759, Retrieved from the Internet: <URL: https://www.mdpi.com/2071-1050/12/5/1759/pdf>.

Haghpanah, et al., "Optimal Shelter Location-Allocation during Evacuation with Uncertainties: A Scenario-Based Approach," arXiv: Optimization and Control, 2018, 9 pages, arXiv: 1802.05775, Retrieved from the Internet: <URL: https://arxiv.org/ftp/arxiv/papers/1802/1802.05775.pdf>.

IBM, "What is the IBM Sterling Supply Chain Suite?," IBM Sterling Supply Chain Suite, [accessed on Sep. 1, 2020], 8 pages, Retrieved from the Internet: <URL: https://www.ibm.com/supply-chain/sterling>.

Le, "Machine Learning methods for optimization in Multi-Agent Decision Support System: application to Sign Placement for Tsunami Evacuation," Journal of Ar lincial Societies and Social Simulation, Dec. 13, 2016 [published May 2017], 149 pages, Researchgate, DOI: 10.18564/jasss.3395, Retrieved from the Internet: <URL: https://www.researchgate.net/publication/337100462_>.

Li, et al., "Bilevel Optimization for Integrated Shelter Location Analysis and Transportation Planning for Hurricane Events," Journal of Infrastructure Systems, Journal of Infrastructure Systems, 2011 [Sep. 22, 2020], 2 pages, vol. 17, Issue 4, ASCE, Reston, VA, DOI: 10.1061/(ASCE)IS.1943-555X.0000067, Retrieved from the Internet: https://ascelibrary.org/doi/full/10.1061/%28ASCE%29IS.1943-555X.0000067>.

Ma, et al., "Emergency shelters location-allocation problem concerning uncertainty and limited resources: a multi-objective optimization with a case study in the Central area of Beijing, China," Geomatics, Natural Hazards and Risk, 2019, 26 Pages, vol. 10, No. 1, ISSN: 1947-5705, https://doi.org/10.1080/19475705.2019.1570977, Retrieved from the Internet: <URL: https://www.tandfonline.eom/doi/pdf/10.1080/19475705.2019.1570977?needAccess-true>.

Rodriguez, "Modern Game Theory and Multi-Agent Reinforcement Learning Systems," LinkedIn, Jun. 18, 2018 [accessed on Sep. 11, 2020], 4 pages, Retrieved from the Internet: <URL: https://www.linkedin.com/pulse/modern-game-theory-multi-agent-reinforcement-learning-jesus-rodriguez>.

Wikipedia, "Facility location problem," Wikipedia, the free encyclopedia, [accessed on Sep. 1, 2020], 8 pages, Retrieved from the Internet: <URL: https://en.wikipedia.org/wiki/Facility_location_problem>.

Xu, et al., "A multi-objective optimization based method for evaluating earthquake shelter location-allocation," Geomatics, Natural Hazards and Risk, May 14, 2018, 17 pages, vol. 9, issue 1, DOI: 10.1080/19475705.2018.1470114, Retrieved from the Internet: <URL: https://www.tandfonline.com/doi/pdf/10.1080/19475705.2018.1470114?needAccess=true>.

Zhao, et al., "A hierarchical mathematical model of the earthquake shelter location-allocation problem solved using an interleaved MPSO-GA," Geomatics, Natural Hazards and Risk, Jul. 1, 2019, 27 pages, vol. 1, Issue 1, Informa UK Limited, DOI: 10.1080/19475705.2019.1609605, Retrieved from the Internet: <URL: https://www.tandfonline.com/doi/pdf/10.1080/19475705.2019.1609605?needAccess=true>.

Zhao, et al., "Planning Emergency Shelters for Urban Disaster Resilience: An Integrated Location-Allocation Modeling Approach," Sustainability, 2017, vol. 9, Issue 2098, 20 pages, DOI:10.3390/su9112098, Retrieved from the Internet: <URL: https://www.mdpi.com/2071-1050/9/11/2098/pdf>.

\* cited by examiner

100

102 capturing location data of the target locations as well as location and movement data of the objects

104 building a graph

106 integrating constraints into the graph

108 determining for each of the several objects a desired target location

110 selecting for each of the several objects an optimal path as the trajectory between the object and the desired target location

FIG. 1

GRAPH ENABLED LOCATION OPTIMIZATION

BACKGROUND

The invention relates generally to a method for path optimization, and more specifically, to a method for allocating target locations to optimize trajectories between several objects and the target locations. The invention relates further to a related target location allocation system for optimizing trajectories between several objects and the target locations, and a computer program product.

Optimizing facility locations based on movement and flow of objects like people, goods, etc. is a computationally complex problem. It may be compared to the travelling salesman problem, which is also a complex problem. However, the solution to the optimizing facility locations problem has wide-ranging applications from enhancing supply chains to responding to emergency situations. This may also have an added value in pandemic or other critical situations in which people need to find a shelter or a medical help station.

BRIEF SUMMARY

Additional aspects and/or advantages will be set forth in part in the description which follows and, in part, will be apparent from the description, or may be learned by practice of the invention.

According to one aspect of the present invention, a method for allocating target locations to optimize trajectories between several objects and the target locations may be provided. The method may comprise capturing location data of the target locations as well as location and movement data of the objects, building a graph using the target locations as well as the location and movement data and integrating, by the one or more computing systems or the controllers, constraints into the graph.

Additionally, the method may comprise determining for each of the several objects a desired target location using a first optimization system. Thereby, endpoints of a trajectory between each of the objects and its respective desired target locations may be determined. Moreover, the method may comprise selecting for each of the several objects an optimal path as the trajectory between the object and the desired target location, using a second optimization system, and taking into account movements of other objects along their trajectories.

According to another aspect of the present invention, a target location allocation system for optimizing trajectories between several objects and the target locations may be provided. The target locations allocation system may comprise a memory and a processor communicatively coupled to the memory, wherein the processor, using program code stored in the memory, may be configured to capture location data of the target locations as well as location and movement data of the objects and build a graph using the target locations as well as the location and movement data and integrate constraints into the graph.

The processor, using program code stored in the memory, may also be configured to determine, for each of the several objects, a desired target location using a first optimization system, whereby endpoints of a trajectory between each of the objects and its respective desired target locations may be determined. The processor, using program code stored in the memory, may additionally be configured to select for each of the several objects an optimal path as the trajectory between the object and the desired target location, using a second optimization system, and take into account movements of other objects along their trajectories.

A method for allocating target locations to optimize trajectories between several objects and said target locations, said method comprising capturing location data of said target locations as well as location and movement data of said objects and building a graph using said target locations as well as said location and movement data. Integrating constraints into said graph and determining for each of said several objects a desired target location using a first optimization system, thereby determining endpoints of a trajectory between each of said objects and its respective desired target location. Selecting for each of said several objects an optimal path as said trajectory between said object and said desired target location, using a second optimization system, and taking into account movements of other objects along their trajectories.

In accordance with another aspect, said desired target location is a desired target location category.

In accordance with another aspect, wherein said first optimization system and/or said second optimization system is a reinforcement learning system.

In accordance with another aspect, wherein said constraints are modelled using a target function and wherein said target function has as arguments at least one selected out of said group comprising social distancing requirements, strategic risk factors, a disease transmission factor, available trajectory path and a storage capacity of respective target locations.

In accordance with another aspect, wherein one of said several objects are selected out of said group comprising people, animals, vehicles, and goods, letters, parcels, containers, deliverables, and circuit board components.

In accordance with another aspect, wherein each of said locations is selected out of said group comprising a building, an apartment, a warehouse, a position on a printed circuit board, a shelter, a storage facility, a factory, a hospital, an office building and a residential complex.

In accordance with another aspect, wherein said target locations as well as said location and movement data are embedded in a map and wherein said target locations represent fixed locations in said map stored as vertex information.

In accordance with another aspect, wherein said target locations as well as said location and movement data are embedded in a map and wherein said trajectories represent paths in said map stored as edge information.

In accordance with another aspect, wherein said map is selected out of said group comprising a geographical map, a warehouse layout, a building plan, and a printed circuit board layout.

In accordance with another aspect, wherein said location and movement data are collected by said tracing objects using electronic tracking devices.

In accordance with another aspect, wherein, if a stop criterion is not met for said second optimization system, said constraints are altered.

A target location allocation system for optimizing trajectories between several objects and said target locations, said target locations allocation system comprising a memory and a processor communicatively coupled to said memory, wherein said processor, using program code stored in said memory, is configured to capture location data of said target locations as well as location and movement data of said objects. Building a graph using said target locations as well as said location and movement data and integrate constraints into said graph. Determine for each of said several objects a desired target location using a first optimization system, thereby determining endpoints of a trajectory between each of said objects and its respective desired target location and select for each of said several objects an optimal path as said trajectory between said object and said desired target location, using a second optimization system, and taking into account movements of other objects along their trajectories.

A computer program product for optimizing trajectories between several objects and said target locations, said computer program product comprising a computer readable storage medium having program instructions embodied therewith, said program instructions being executable by one or more computing systems or controllers to cause said one or more computing systems to capture, by said one or more computing systems or said controllers, location data of said target locations as well as location and movement data of said objects, and build, by said one or more computing systems or said controllers, a graph using said target locations as well as said location and movement data. Integrate, by said one or more computing systems or said controllers, constraints into said graph, and determine, by said one or more computing systems or said controllers, for each of said several objects a desired target location using a first optimization system, thereby determining endpoints of a trajectory between each of said objects and its respective desired target location. Select, by said one or more computing systems or said controllers, for each of said several objects an optimal path as said trajectory between said object and said desired target location, using a second optimization system, and taking into account movements of other objects along their trajectories.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 1 shows a block diagram of an embodiment of the inventive method for allocating target locations to optimize trajectories between several objects and the target locations.

DETAILED DESCRIPTION

Figure 2:
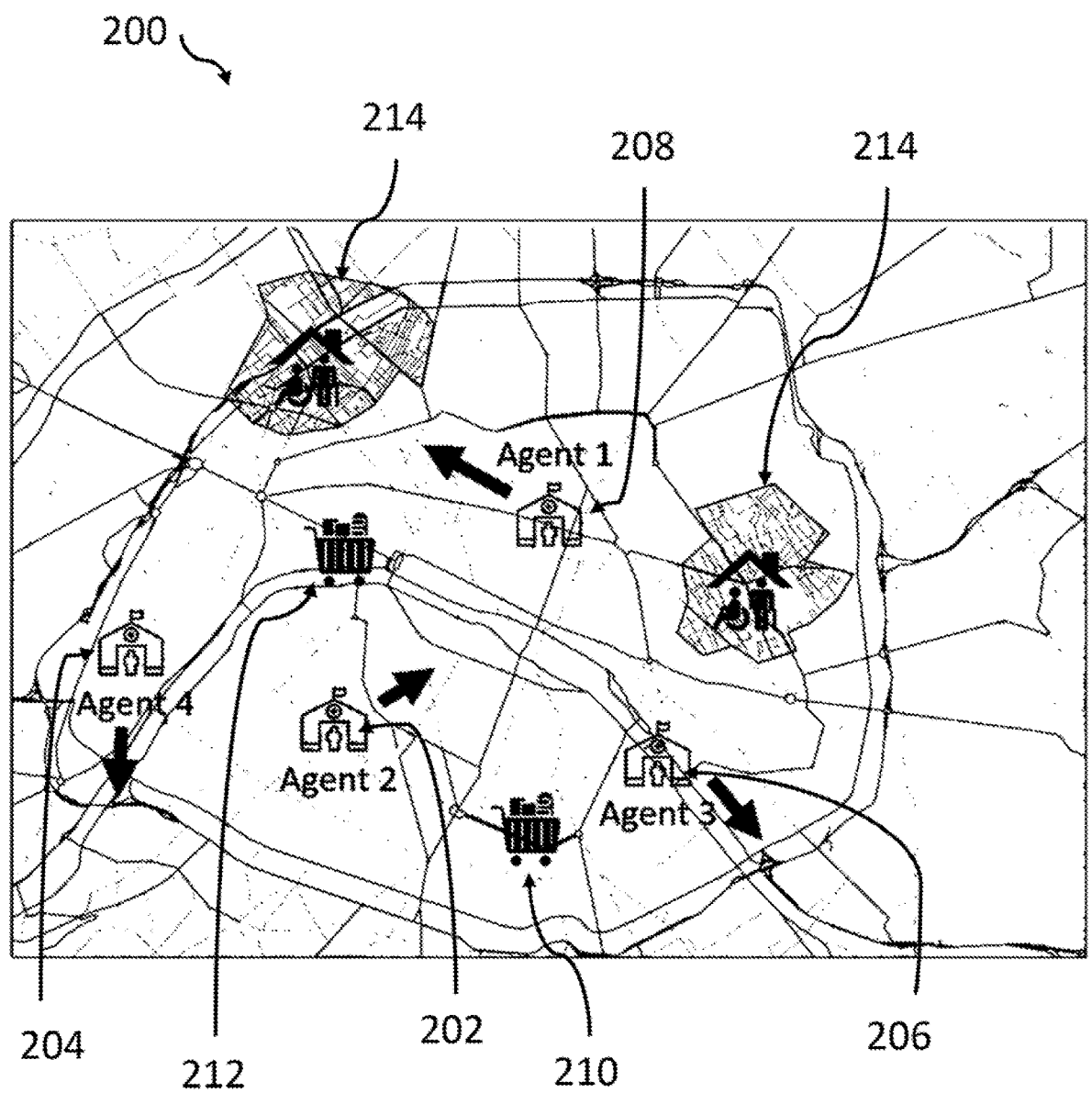
FIG. 2 shows a diagram of a map of a city with different paths and locations.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The term 'target location' may denote an endpoint of a path to be selected. The target location may be a geographical location having predefined characteristics, like a shelter, a shop, a medical center, etc. Other types of target locations may be possible. One of them may be positions of electronic devices on a printed circuit board. Another example for a target location may be a shelf spot in a warehouse.

The term 'trajectory' may denote lines on a map built from path portions reflecting the possible path portions of a given map.

The term 'object' may denote any movable item which may be moved from a starting point to an endpoint or target location. The object may be able to move based on its own capabilities (e.g., people, animals) or it may be moved using external help (e.g., goods, parcels, and so on)

The term 'location data' may denote a point on a map. The location data may be typically expressed as coordinates. This may apply to a starting location, a current location and a target location.

The term 'movement data' may denote and include a current position, a past path/trajectory, a probable future path/trajectory as well as velocity data.

The term 'graph' may denote a set of objects in which some pairs of the objects are in some sense "related". A typical relationship may be a path or trajectory between two objects. The objects may correspond to mathematical abstractions called vertices (also called nodes or points) and each of the related pairs of vertices is called an edge (also called link or line). Typically, a graph is depicted in diagrammatic form (e.g., city map) as a set of dots or circles for the vertices, joined by lines or curves for the edges. Hence, the combination of a geographical map and the graph may denote an embedded graph, i.e., embedded into the map.

The term 'constraint' may denote a bottleneck in the way between a current location and the target location. There may be a roadblock on the projected trajectory or a close-by target location may be blocked somehow and an alternative target location—e.g., of the same type—may have to be selected.

The term 'desired target location' may denote an endpoint of a movement of an object in the real world which may be mapped to an embedded map.

The term 'first optimization system' may denote a system adapted to identify or determine a desired target location conforming to a predefined set of characteristics. A practical example may be a medical support location in case of, e.g., a pandemic situation. The first optimization system may be implemented as a trained reinforcement learning system.

The term 'endpoint' may denote a target location.

The term 'optimal path' may denote a trajectory between a current position and an endpoint or target location. The optimal path may be selected among a plurality of potential paths or trajectories also taking into account a set of constraints adding "potential path costs" to selected one's of the potential paths.

The term 'second optimization system' may denote a system enabled to identify or determine the optimal path between a current position of an object and an endpoint. Also here, constraints have to be reflected when selecting the optimal path. Also such a system may be implemented as a trained reinforcement learning system.

The term 'target location category' may denote a group of target locations conforming to a same or similar set of characteristics. Examples for categories may be "hospital", "carpark", "shelter", "medical diagnosis pop-up spot", shopping location, pharmacy, police station, and similar. The examples for categories may vary from one application area to another. For example, in case a warehouse, a shelf location category may be a storage location or shelf place of similar size, or it may take the same amount of time to fetch an item stored in the shelf location.

The term 'reinforcement learning system' may denote—in contrast to supervise of unsupervised learning—the area of machine learning concerned with how soft the agents are to take actions in an environment in order to maximize the notion of cumulative reward. Labeled input/output pairs are not needed. The focus is on finding a balance between exploration (of uncharted territory) and exploitation (of current knowledge). One or more agents may be integrated in such a reinforcement learning system. The agent(s) may receive input signals from the environment to generate an output or action (in the terminology of reinforcement learning systems) and may optimize its behavior through a plurality of optimization cycles or epochs.

The term 'social distancing requirement' may denote a minimum distance required or recommended between people in order to make an infection from one person to another almost unlikely.

The proposed method for allocating target locations to optimize trajectories between several objects and the target locations may offer multiple advantages, contributions and technical effects.

The proposed concept may advantageously be activated in order of the optimizing the facility locations problem in an elegant way. This may be used ideally for shelters in pandemic situations.

A plurality of other scenarios may be addressed successfully with the proposed concept, like optimizing supply chains, traffic control, parcel and goods distribution and logistics as well as finding proper target locations for electric and/or electronic components on a printed circuit board. Thus, application areas of the here proposed concept can be found in almost all vertical industries and at every size. The solution may also be used to optimize a manufacturing site layout (e.g., where to place specific machinery and how to optimize the transportation path between robots and storage places). It may also be used to optimize security exit paths in sports stadiums, train stations or shopping centers. Hence, wherever the number of target locations is flexible, constraints may have to be considered and objects are moved around or moved by their own capability, the proposed concept may be used advantageously.

According to a more complete embodiment of the method, the desired target location may be a desired target location category. Hence, the target location may become a group of locations having the same or similar characteristics. These may reflect experiences (in particular, experienced constraints) and/or new options. In case of a pandemic, the new options may comprise relating to new disease test centers and the experience constrains may reflect long waiting times for already existing disease test centers. In such a case, these additional data to determine the optimal trajectory may also be considered.

According to an advantageous embodiment of the method, the first optimization system and/or the second optimization system may be a reinforcement learning system a trained reinforcement learning system. Thereby, one or the other or both optimization systems may be a single agent or multi-agent system. Additionally, the first and the second optimization system may use common components or may be implemented as the same reinforcement learning system configurable for the different tasks at hand.

According to an additional embodiment of the method, the constraints may be modelled using one or more target functions. Thereby, the target function may use as arguments at least one social distancing requirement, at least one strategic risk factor, and at least one disease transmission factor, available trajectory path, and a storage capacity of respective target locations. Additionally, also data about a crowdedness of the available trajectory paths may be used. Regarding the storage capacity of the respective target locations, data like shelter capacity, warehouse capacity and so on may be used.

According to an optional embodiment of the method, one of the several objects may be selected out of the group comprising people, animals, vehicles (e.g., pedestrians, cars, bicycles, motorcycles, ships in the harbor), goods, letters, parcels, containers (e.g., Castor containers used to transport radioactive material), deliverables, and circuit board components. It may be noted that also other movable items may be denoted as object in the sense of the here proposed concept.

According to a useful embodiment of the method, each of the locations may be selected out of the group comprising a building, an apartment, a warehouse, a position on a printed circuit board, a shelter, a storage facility, a factory, a hospital, an office building and a residential complex. The list may be extended by a target location adapted to receive one or more of the movable objects.

According to a preferred embodiment of the method, the target locations, as well as, the location and movement data may be embedded in a map. Furthermore, the target locations may represent fixed locations on the map stored as vertex information. Hence, the map may be an electronic map comprising coordinates at which target locations may be stored. Alternatively, a location storage system may store an identifier of the target location together with map specific coordinates or with coordinate data in a standardized format. Hence, locations may be uniquely identifiable on the related map.

According to an enhanced embodiment of the method, the target locations, as well as the location and movement data, may be embedded in the map, thus embedded graph or embedded knowledge graph. Furthermore, the trajectories may represent paths on the map stored as edge information, wherein, additionally, locations may be stored as vertices of a graph. This way, a path between the locations may easily be identified as a sequence of edges and vertices.

According to an interesting embodiment of the method, the map may be selected out of the group comprising a geographical map, a warehouse layout, in particular, comprising storage locations, a building plan and a printed circuit board layout. The building plan may be a plan of a shopping center, an underground railway system, a government or otherwise at least in parts public building, an underground three-dimensional mining map, a map of a ship (e.g., a cruise liner or airplane carrier) or any other complex structure in which objects may be moved. This may also be the case for a printed circuit board on which electronic components have to be placed, wherein the trajectories may be implemented as electric connections between different electric, electro-mechanic and/or electronic components.

According to another enhanced embodiment of the method, the location and movement data may be collected by the tracing of the objects using electronic tracking devices. Technically, they may be implemented as a GPS (global positioning system) tracker, GPS tracking via smartphone—e.g., based on GMS positioning and/or 4G or data, drones or planes equipped with optical observation systems (e.g., optical or infrared cameras). Furthermore, the tracing of the objects may also be based on based satellite video data, cameras installed on a flying balloon or similar.

According to one permissive embodiment, the method may comprise that if a stop criterion is not met for the second optimization system (e.g., by time out, a too high number of optimization loops or comparable) the constraints may be altered. One example of such altering may be to add more target locations, e.g., more shelters.

In the following, a detailed description of the figures will be given. All instructions in the figures are schematic. Firstly, a block diagram of an embodiment of the inventive method for allocating target locations to optimize trajectories between several objects and the target locations is given. Afterwards, further embodiments, as well as embodiments of the target location allocation system for optimizing trajectories between several objects and the target locations, will be described.

FIG. 1 shows a block diagram of a preferred embodiment of the method 100 for allocating target locations (e.g., shelters, or warehouses) to optimize trajectories, and particular, paths, streets sequences, and so on, between several objects and the target locations. The objects may exemplary be people, goods, radio-active containers (Castors). The method comprises capturing, 102, location data (in the form of coordinates in a map) of the target locations, as well as, location and movement data of the objects. Thereby the location and movement data of objects may be (beside an actual position) also a velocity, a probable path/trajectory, a kind of transportation method, and so on.

The method 100 comprises also building 104, a graph (e.g., in an environment map (i.e., embedded graph) which may be a geographical map, and architecture map, a layout of a printed circuit board, a warehouse map, and comparable) using the target locations as well as the location and movement data.

Furthermore, the method 100 comprises integrating, 106, constraints, e.g., specific known location and movement requirements (e.g., roadblocks), into the graph, and thus with references to the map. This may also include relative requirements, e.g., social distancing rules also constrains regarding target locations.

Moreover, the method 100 comprises determining, 108, for each of the several objects, a desired target location using a first optimization system, e.g., in the form of a multi-agent reinforcement learning system, thereby determining endpoints of a trajectory between each of the objects and its respective desired target location.

The method 100 comprises selecting, 110, for each of the several objects an optimal path or trajectory between the object and the desired target location. Thereby, different optimization functions regarding speed, energy consumption, distance, risk, etc., may be used. For this, the second optimization system may be instrumental and used. It may also be noted that the first optimization system and the second optimization system may at least in parts be identical, the same trained reinforcement learning system, or may use the same computing resources. Thereby, other objects are taken into account, i.e., reflected along their trajectories. From this, additional constraints may come up dynamically.

FIG. 2 shows a diagram of a map 200 of a city with different paths, i.e., streets, walkways, places, etc., and locations. It may be noted that only a very limited number of potential streets are shown in the map of FIG. 2. The map shows exemplary medical care centers 202, 204, 206, 208 as well as grocery stores 210, 212. The bold arrows shown are related to agents of the reinforcement learning system predicting different actions in form of different paths on the map to a target location, thereby reflecting, via the reward function of the different agents, crowds and avoiding risk areas such as nursing homes 214 (dangerous because of potential infect transfers).

It may be noted that the underlying method may react dynamically to changing conditions in the form of currently appearing crowds of people, if social distancing is selected to be one of the constraints, or traffic jams, if a car accident or a maximum car density in a specific area have been selected to the one of the constraints. Thereby, dynamic movement data may be received based on different ethical systems. The moving objects (e.g., people, cars, etc.) can be equipped with a GPS tracker, e.g., as part of the smart phone or, the movement data may be derived from drone plane or helicopter-based cameras.

Figure 3:
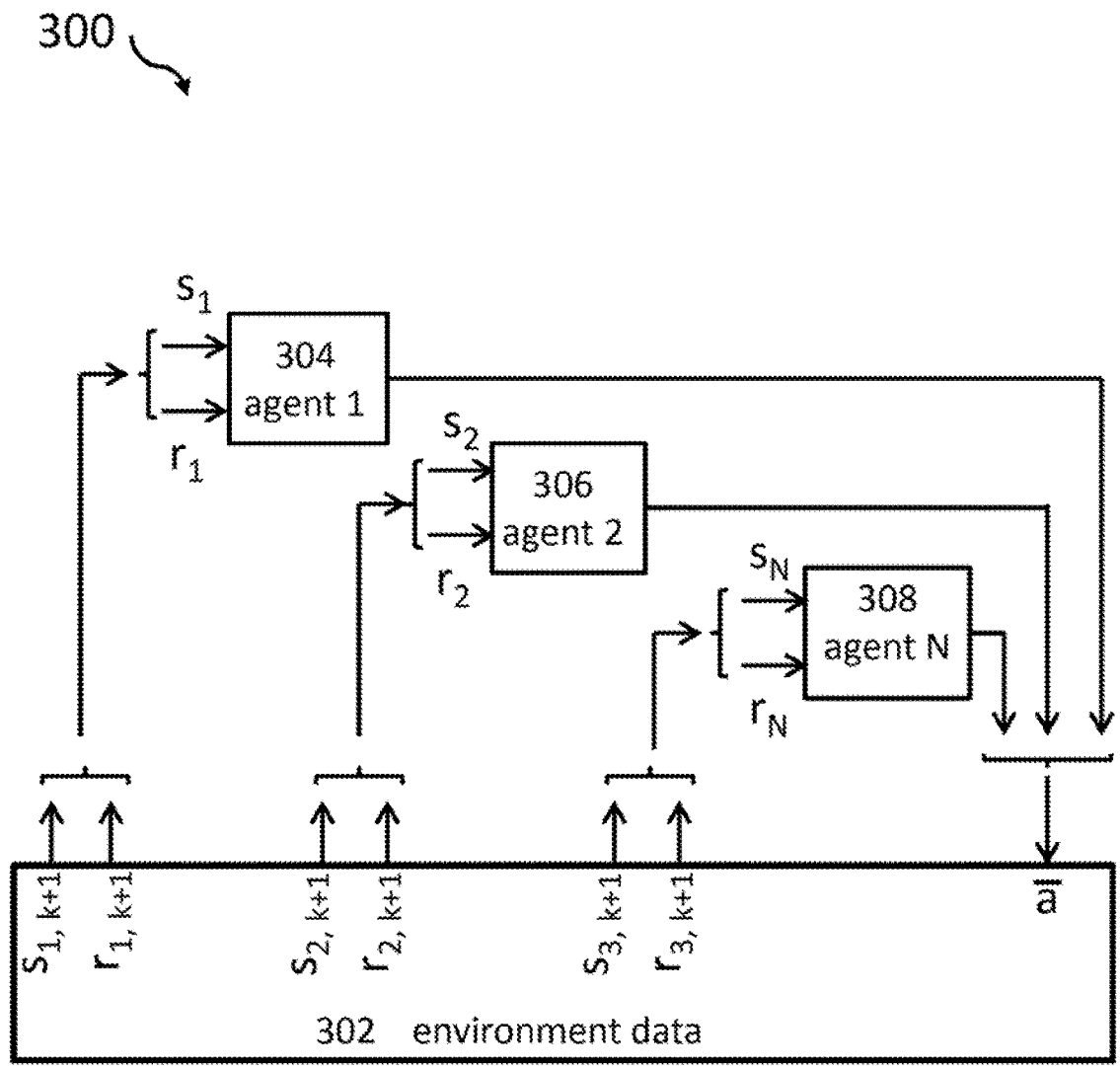
FIG. 3 shows a block diagram of an embodiment of a multi-agent reinforcement learning system which may be mapped to the map according to FIG. 2.

FIG. 3 shows a block diagram of an embodiment of a multi-agent reinforcement learning system 300 which may be mapped exemplary to the map according to FIG. 2. Box 302 may represent the environment data 302 (i.e. the map with the graph data) from which life data in form of movement data or location data can be extracted. Selected ones of these data are fed to the software agents 304, 306, 308 (less or more agents are possible) to predict either a target location and/or an optimal path to the target location. To do so, the agents 304, 306, 308 receive state $s_1, s_2, \ldots, s_N$ data as well as, reward data $r_1, r_2, \ldots, r_N$ data is input. The 304, 306, 308 agents produce an action as output signal which is fed in a closed loop process and back to the environment data as an averaged action value. This averaged action value together with the environment data, e.g., location data of the target locations, as well as, location and movement data of the objects, will be used for a next, i.e., k+1, epoch of the reinforcement learning system. The algorithmic circle continues until a stop condition is met.

Closing the loop to the method 100 discussed in the context of FIG. 1, exemplary, an embodiment for a pandemic situation may be discussed in more detail. However, it may be highlighted that the proposed concept may also be applied to completely other situations having the same underlying problem of optimizing path to facility locations. Accordingly, the proposed method comprises different phases: a data capturing phase (FIG. 1, 102), a data preprocessing phase comprising the graph building (FIG. 1, 104)

and constrains integration phase (FIG. 1, 106) and finally the optimization phase using MARL (mighty-agent reinforcement learning) system. The last phase comprises the desired target destination determination (FIG. 1, 108) and the selection of an optimal path (FIG. 1, 110).

During the phase of capturing the data, the method and thus the underlying system initiates with capturing users metrics for hot-spot determination including density of people living in nearby different regions and estimating the age factor of people residing in that area. The age factor may be an important constraint as could be observed during the Covid-19 pandemic. Additionally, Internet-of-Things (IoT) mobile devices can be used to be tracked by, e.g., official authorities. Furthermore, a swarm of drones can also be used to capture the crowd density at micro level. Additionally, dynamic satellite images may be used in a machine-to-machine formation architecture to capture the crowd movement as another channel of input data. It may be noted that these data sources provide information about the crowd density and movements but also regarding housing and potential shelter.

In the second phase, the data preprocessing phase, critical steps of preparing and embedded graph to enable the MARL approach successfully will be discussed.

The embedded knowledge graph on a map (taken from status quo) is created including data about housings of people, buildings of interest like nursing homes, schools, grocery stores, etc. These are represented as vertices in the graph. The movement of people, in another more general embodiment, of the objects, are represented as edges and categories based on grouping of people, e.g., related to (i) a group at risk or not, (ii) movements necessary or for leisure and (iii) other influencing factors.

In particular, the edges can be weighted by the quantity of people moving from one vertex to another during a certain time period. In another implementation, the impact of different types of movements (e.g., leisure, work, . . . ) by different types of people (e.g., high-risk groups, low-risk groups, people essential to the functioning of the healthcare system in society, etc.) is taken into account in the weighting. For example, only the work-related movements of high-risk groups could be considered in the machine-learning model building.

Next, requirements and constraints must be added to the map, i.e., the embedded knowledge graph, respectively. The requirements and constrains can include factors from the status quo, as well as, the to-be scenario (e.g., during the pandemic). This could include simulating movements based on given rules of the official bodies, e.g., movements may only be allowed to go to a doctor, a healthcare center, or a grocery store. As a result, the needs of people in a given region for performing the decision optimization may be predicted. Additionally, feasibility constrains that apply in all circumstances can be applied, e.g., average movement (e.g. walking) speed of people, number of people that can use a certain mode of transportation at a given time, etc. All this information can again be stored as edges in the embedded graph.

Furthermore, understanding relevant shelter options can be important and can, e.g., consist of finding relevant sports and assigning a value how good this would fit such as a purpose (e.g., is it big enough?, easy to access?, easy to clean?, easy to secure?, etc.). For example, based on the IoT data, captured as described above, one could indeed use the approximate capacity of a given building by calculating how many people are on average in that building at night. Thus, such data would be an additional attribute of the node (or weight or attribute of an edge, respectively).

The optimization phase using MARL also comprises a series of activities. Firstly, the reinforcement learning system, in particular, based on a plurality of agents, is identifying or determining the number of shelters and locations within an area or region (e.g., in a city). This information is then used to generate the embedded graph (i.e., the knowledge graph embedded in a map) representing all apartments, critical locations (e.g., as vertices) and the streets (e.g., as edges).

The reinforcement learning system is initialized with a given number of shelters (based on the number of people in that area) and spread them evenly distributed. Short path algorithms (one-to-all) are used to find shortest paths from each current shelter a position to all apartments. The shortest path for each apartment to its closest shelter is selected. Thereby, movements are added as weights to the edges. In addition, movements are determined based on the restrictions and most likely movements, e.g., movements to doctors, stores, etc., are added as weights to the edges of the embedded graph.

The map is then evaluated, whereby evenly distributed edge weights are assigned a positive weight value, a high-level of movement on single edges gets a negative value and, movements close to critical locations such as nursing homes are also assigned a negative value.

Problem zones are marked, and the reinforcement learning system adjusts especially the locations of these shelters. The described loop is performed again and again until the reinforcement learning system finds a good solution. This may be determined by checking a stop condition in every round. Thereby, the reward functions of the software agents maximize the impact factor as per the model state parameters. The impact factor takes into account factors such as the time taken to arrive at the shelter locations, the risk of transmission by visiting or passing certain areas and the occupancy of shelter.

A positive reward function is given for a positive iteration in impact factors. The negative reward is given if more time is taken in the next iteration by the agent by enabling the distribution framework. In a more complex implementation, the MARL model could be enriched by including the number of shelters as a degree of freedom.

The impact factor could have different mathematical forms. For example, in a simple embodiment, it could take the form $(1/(1+T))*(1/(1+R))*(1/(1+S))$, wherein T is the total time taken to arrive at the shelter location, R is the total risk of infection by parsing certain academic hotspots (computed, e.g., by treating in fact events as independent and multiplying the individual probabilities), and S is the standard deviation of the shelter occupancy. I.e., it is probably better to avoid having some very empty shelters in some highly crowded ones. In a more complex embodiment, IoT data of individuals (e.g., body temperature of people, self-entered symptoms, blood pressure, etc.) could drive more of the optimizations such that, e.g., the contacts between all of the likely disease carriers and the likely healthy individuals are minimized.

A phase of this embodiment of the proposed method, i.e., the obtaining the optimized solution and checking against the stop criterion, has also a couple of steps.

Multiple epochs are run in the simulation environment in order to cover all the requirements and use cases. The optimization can be stopped when one of the following criteria is met: 1. The number of epochs exceeds a given threshold value. 2. The runtime of the simulation exceeds a given threshold value. 3. The improvement of an impact factor in time taken from one epoch to the next are below a given threshold value. 4. The impact factor in time taken for movements are, respectively, above or below given threshold values.

It may be noted that if the optimization is stopped by the criteria 1 to 3, the model is only deployed if it meets certain threshold values but less stringent than those in criterion 4; i.e., the minimum usefulness of the model.

The threshold values for criterion 4 can be set by assuming a certain error, compared with the best-case scenario, e.g., comparing with the sample formula above shows that the best-case scenario could be of the form $(1/(1+T))$ for an infection risk of 0 additional to occupancy standard deviation of 0. Naturally, in another implementation, weighting could be related to the different factors to redefine the formula and the best-case scenario.

Furthermore, depending on the stopping criterion that is applied and the nature of the optimized solution, a feedback loop can be created in step three of the method, i.e., the optimization using the MARL, i.e., the graph requirements and constraints, for the next round optimization. E.g., if the model does not terminate with stopping criterion 4, the number of shelters is increased in step three of the method.

Figure 4:
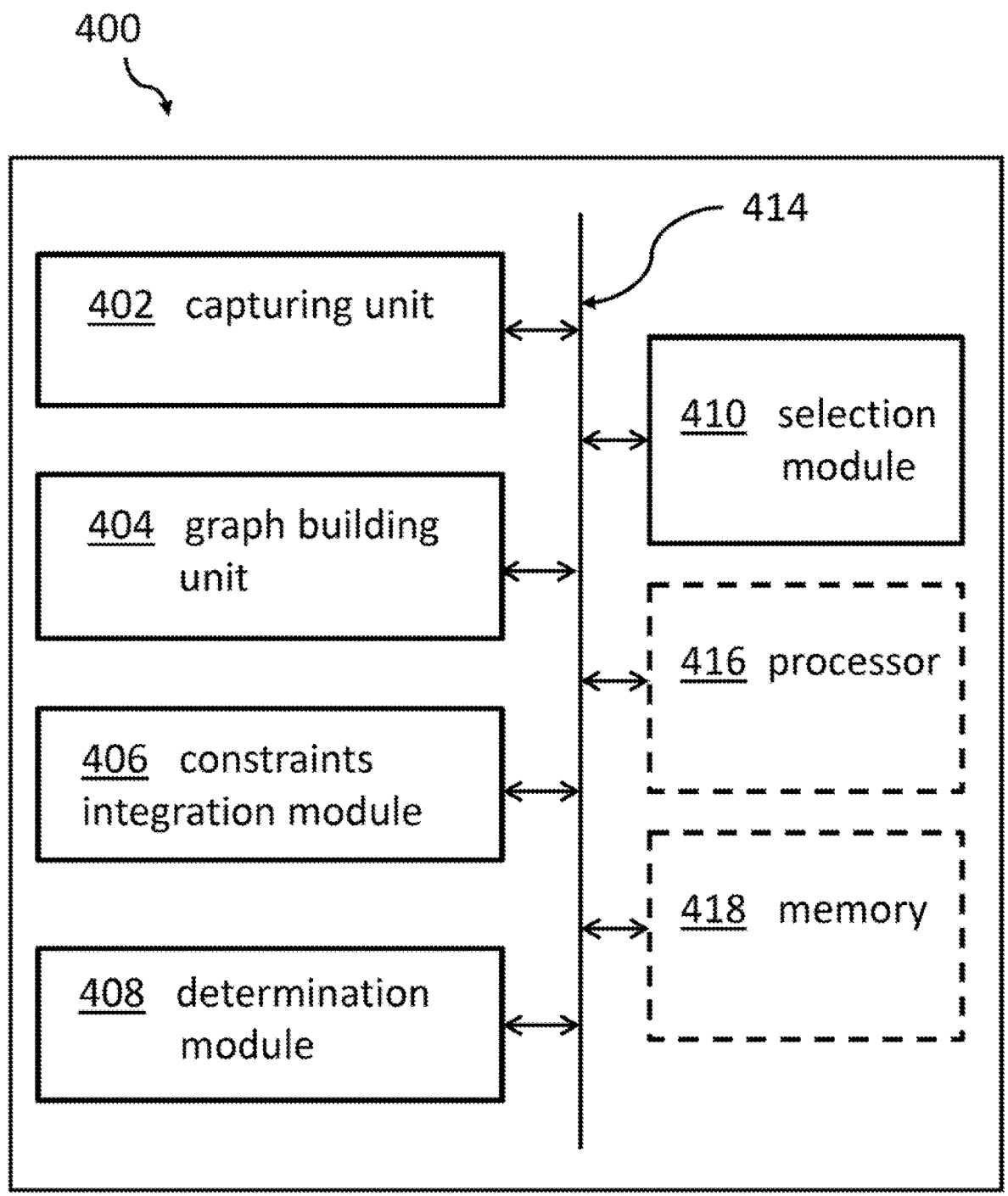
FIG. 4 shows a diagram of an embodiment of the target location allocation system for allocating target locations to optimize trajectories between several objects and the target locations.

For completeness reasons, FIG. 4 shows a diagram of an embodiment of the target location allocation system 400 for allocating target locations to optimize trajectories between several objects and the target locations. The target location allocation system 400 comprises a memory 418 and a processor 416 communicatively coupled to the memory. Thereby, the processor, using program code stored in the memory 418, is configured to capture location data of the target locations as well as location and movement data of the objects, build a graph using the target locations as well as the location and movement data and integrate constraints into the graph.

Additionally, the processor 416, using program code stored in the memory 418 is also configured to determine for each of the several objects a desired target location using a first optimization system, thereby determining endpoints of a trajectory between each of the objects and its respective desired target location and select for each of the several objects an optimal path as the trajectory between the object and the desired target location, using a second optimization system, and taking into account movements of other objects along their trajectories.

Thereby, the above-described activities of the processor 416 can also be implemented using specific hardware modules and/or units related to the activities, like a capturing unit 402, a graph building unit 404, a constraints integration module 406, a determination module 408 (including the first reinforcement learning system), and a selection module 410 (including the second reinforcement learning system). It may also be possible to implement these functions in FPGA (field programmable gate arrays or the like).

These modules and units can be electrically connected among each other for a signal exchange. Alternatively, they may also be electrically connected to a system internal bus system 414 for data and signal exchange, as shown in FIG. 4. Furthermore, also the system specific processor 416 and system specific memory 418 may also be connected to the system internal bus system 414.

Figure 5:
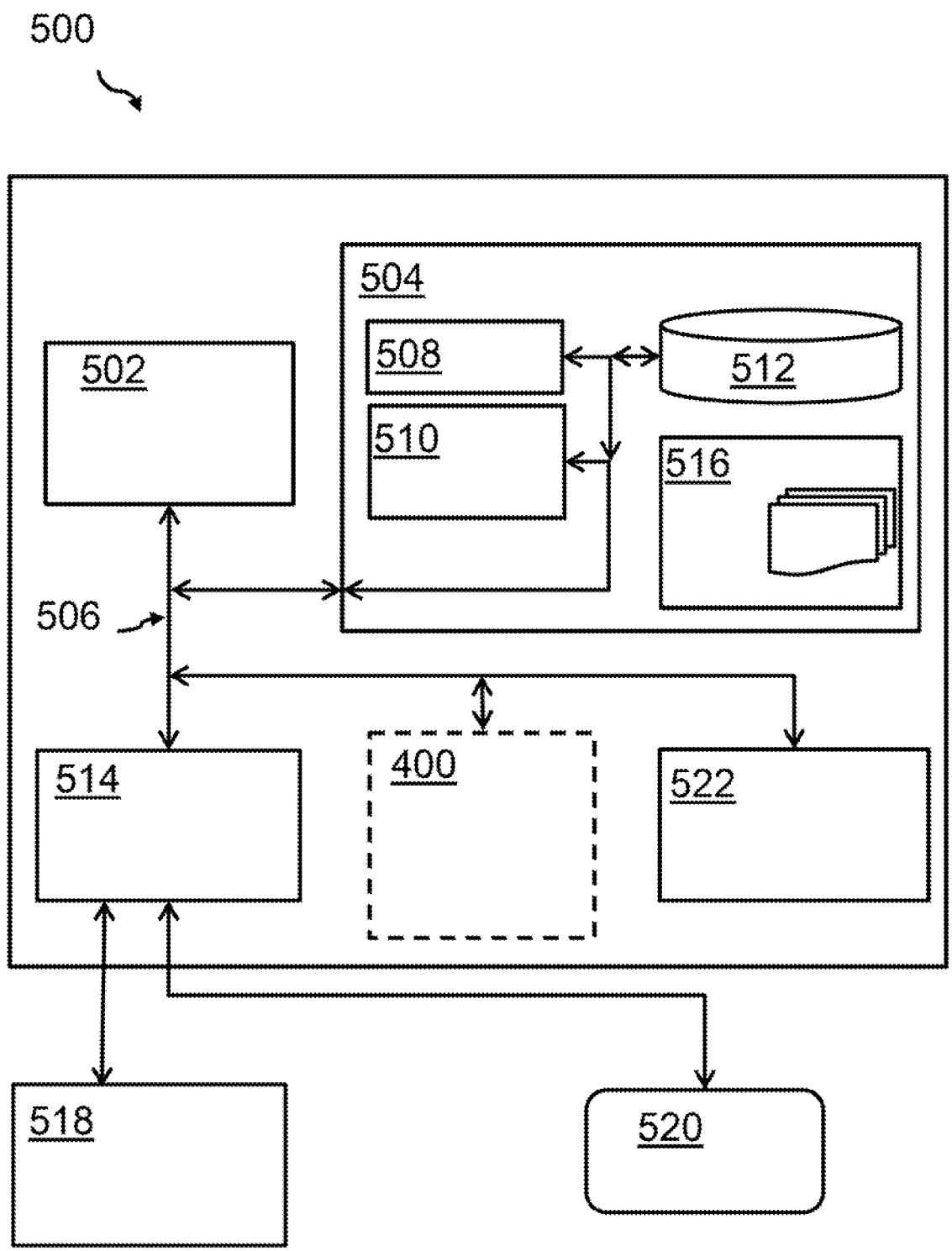
FIG. 5 shows an embodiment of a computing system comprising the target location allocation system according to claim 4.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purposes or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the target location allocation system 400 for optimizing trajectories between several objects and the target locations may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for allocating target locations to optimize trajectories between several objects and said target locations, said method comprising:

capturing location data of said target locations as well as location and movement data of said objects:

building a graph using said target locations as well as said location and movement data;

integrating constraints into said graph, wherein said constraints are directly related to said target location, wherein said constraints are modelled using a target function and wherein said, target function has as arguments at least one selected out of said group consisting of social distancing requirements, strategic risk factors, a disease transmission factor, and a storage capacity of respective target locations;

determining for each of said several objects a desired target location using a first optimization system, thereby determining endpoints of a trajectory between each of said objects and its respective desired target location; and selecting for each of said several objects an optimal path as said trajectory between said object and said desired target location, using a second optimization system, and taking into account movements of other objects along their trajectories.

2. The method according to claim 1, wherein said desired target location is a desired target location category.

3. The method according to claim 1, wherein said first optimization system and/or said second optimization system is a reinforcement learning system.

4. The method according to claim 1, wherein one of said several objects are selected out of said group comprising people, animals, vehicles, and goods, letters, parcels, containers, deliverables, and circuit board components.

5. The method according to claim 1, wherein each of said locations is selected out of said group comprising a building, an apartment, a warehouse, a position on a printed circuit board, a shelter, a storage facility, a factory, a hospital, an office building and a residential complex.

6. The method according to claim 1, wherein said target locations as well as said location and movement data are embedded in a map and wherein said target locations represent fixed locations in said map stored as vertex information.

7. The method according to claim 1, wherein said target locations as well as said location and movement data are embedded in a map and wherein said trajectories represent paths in said map stored as edge information.

8. The method according to claim 7, wherein said map is selected out of said group comprising a geographical map, a warehouse layout, a building plan, and a printed circuit board layout.

9. The method according to claim 1, wherein said location and movement data are collected by said tracing objects using electronic tracking devices.

10. A target location allocation system for optimizing trajectories between several objects and said target locations, said target locations allocation system comprising:
one or more computer processors, one or more computer-readable storage media, and program instructions stored on one or more of the computer-readable storage media for execution by at least one of the one or more processors, the program instructions comprising:
program instructions to capture location data of said target locations as well as location and movement data of said objects;
program instructions to build a graph using said target locations as well as said location and movement data;
program instructions to integrate constraints into said graph, wherein said constraints are directly related to said target location, wherein said constraints are modelled using a target function and wherein said target function has as arguments at least one selected out of said group consisting of social distancing requirements, strategic risk factors, a disease transmission factor, and a storage capacity of respective target locations;
program instructions to determine for each of said several objects a desired target location using a first optimization system, thereby determining endpoints of a trajectory between each of said objects and its respective desired target location; and
program instructions to select for each of said several objects an optimal path as said trajectory between said object and said desired target location, using a second optimization system, and taking into account movements of other objects along their trajectories.

11. The target location allocation system according to claim 10, wherein said desired target location is a desired target location category.

12. The target location allocation system according to claim 10, wherein then first optimization system and/or said second optimization system is a reinforcement learning system.

13. The target location allocation system according to claim 10, wherein one of said several objects are selected out of said group comprising people, animals, vehicles, and goods, letters, parcels, containers, deliverables, and circuit board components.

14. The target location allocation system according to claim 10, wherein each of said locations is selected out of said group comprising a building, an apartment, a warehouse, a position on a printed circuit board, a shelter, a storage facility, a factory, a hospital, an office building and a residential complex.

15. The target location allocation system according to claim 10, wherein said target locations as well as said location and movement data are embedded in a map and wherein said target locations represent fixed locations in said map stored as vertex information or wherein said target locations as well as said location and movement data are embedded in a map and wherein said trajectories represent paths in said map stored as edge information.

16. The target location allocation system according to claim 10, wherein said location and movement data are collected by said tracing objects using electronic tracking devices.

17. A computer program product for optimizing trajectories between several objects and said target locations, said computer program product comprising:
one or more non-transitory computer-readable storage media and program instructions stored on the one or more non-transitory computer-readable storage media, the program instructions comprising:
program instructions to capture, by said one or more computing systems or said controllers, location data of said target locations as well as location and movement data of said objects;
program instructions to build, by said one or more computing systems or said controllers, a graph using said target locations as well as said location and movement data;
program instructions to integrate, by said one or more computing systems or said controllers, constraints into said graph, wherein said constraints are directly related to said target location, wherein said constraints are modelled using a target function and wherein said target function has as arguments at least one selected out of said group consisting of social distancing requirements, strategic risk factors, a disease transmission factor, and a storage capacity of respective target locations;
program instructions to determine, by said one or more computing systems or said controllers, for each of said several objects a desired target location using a first optimization system, thereby determining endpoints of a trajectory between each of said objects and its respective desired target location; and
program instructions to select, by said one or more computing systems or said controllers, for each of said several objects an optimal path as said trajectory between said object and said desired target location, using a second optimization system, and taking into account movements of other objects along their trajectories.

* * * * *